(12) United States Patent
Wronski et al.

(10) Patent No.: US 10,683,994 B2
(45) Date of Patent: Jun. 16, 2020

(54) MULTI-PIECE FRAMES

(71) Applicant: Eaton Intelligent Power Limited, Dublin (IE)

(72) Inventors: Grzegorz Wronski, Peachtree City, GA (US); Huang Rongxiu, Shanghai (CN); Michael Troy Winslett, Fairburn, GA (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 16/170,769

(22) Filed: Oct. 25, 2018

(65) Prior Publication Data

US 2019/0195474 A1 Jun. 27, 2019

Related U.S. Application Data

(63) Continuation of application No. 15/265,427, filed on Sep. 14, 2016, now Pat. No. 10,113,723, which is a continuation of application No. 14/242,387, filed on Apr. 1, 2014, now Pat. No. 9,447,950.

(60) Provisional application No. 61/809,167, filed on Apr. 5, 2013.

(51) Int. Cl.
| | |
|---|---|
| *F21V 21/04* | (2006.01) |
| *F21V 17/02* | (2006.01) |
| *F21V 23/00* | (2015.01) |
| *F21S 8/02* | (2006.01) |
| *H02G 3/20* | (2006.01) |
| *H02G 3/08* | (2006.01) |
| *F21V 19/00* | (2006.01) |

(52) U.S. Cl.
CPC ............... *F21V 21/04* (2013.01); *F21S 8/02* (2013.01); *F21S 8/026* (2013.01); *F21V 17/02* (2013.01); *F21V 19/00* (2013.01); *F21V 21/048* (2013.01); *F21V 21/049* (2013.01); *F21V 23/00* (2013.01); *F21V 23/001* (2013.01); *F21V 23/008* (2013.01); *H02G 3/081* (2013.01); *H02G 3/20* (2013.01)

(58) Field of Classification Search
CPC .. F21S 8/02; F21S 8/026; F21V 17/02; F21V 19/00; F21V 21/04; F21V 21/048; F21V 21/049; F21V 23/00; F21V 23/001; F21V 23/008; H02G 3/081; H02G 3/20
See application file for complete search history.

(56) References Cited

U.S. PATENT DOCUMENTS

| | | |
|---|---|---|
| 1,497,535 A | 6/1924 | Bell |
| 1,500,917 A | 7/1924 | Bell |
| 2,515,390 A | 7/1950 | Appleton |
| 3,130,949 A | 4/1964 | Wolff |

(Continued)

*Primary Examiner* — Peggy A Neils
(74) *Attorney, Agent, or Firm* — King & Spalding LLP (57) ABSTRACT

A frame piece of a frame for a luminaire is disclosed. The frame piece can include an inner surface, a first frame coupling feature disposed at a first end of the frame piece, and a second frame coupling feature disposed at a second end of the frame piece. The first frame coupling feature can be configured to mechanically couple to the second frame coupling feature of a first adjacent frame piece. The second frame coupling feature can be configured to mechanically couple to the first frame coupling feature of a second adjacent frame piece. The inner surface forms a partial opening through which a light source component can traverse.

20 Claims, 9 Drawing Sheets

(56) References Cited

U.S. PATENT DOCUMENTS

| | | |
|---|---|---|
| 3,675,807 A | 7/1972 | Lund |
| 4,216,411 A | 8/1980 | Ehret |
| 4,338,577 A | 7/1982 | Sato |
| 4,635,172 A | 1/1987 | Steinke |
| 4,685,037 A | 8/1987 | Akiyama |
| 4,754,377 A | 6/1988 | Wenman |
| 4,768,800 A | 9/1988 | Johns |
| 4,803,603 A | 2/1989 | Carson |
| 4,835,667 A | 5/1989 | Wolfe |
| 4,930,054 A | 5/1990 | Krebs |
| 5,075,831 A | 12/1991 | Stringer |
| 5,662,414 A * | 9/1997 | Jennings ................ F21V 15/01 362/365 |
| 5,836,678 A | 11/1998 | Wright |
| 7,473,005 B2 | 1/2009 | O'Brien |
| 7,993,037 B1 * | 8/2011 | Buse ...................... F21S 8/026 362/362 |
| 9,140,435 B2 | 9/2015 | Yaphe |
| 9,447,950 B1 | 9/2016 | Wronski |
| 2003/0095413 A1 | 5/2003 | Jamison |
| 2009/0231861 A1 | 9/2009 | Wedekind |
| 2009/0231862 A1 * | 9/2009 | Seo .......................... F21S 8/02 362/365 |
| 2009/0290343 A1 * | 11/2009 | Brown ..................... F21K 9/00 362/235 |
| 2012/0044703 A1 | 2/2012 | Wilson |

* cited by examiner

MULTI-PIECE FRAMES

CROSS-REFERENCE TO RELATED APPLICATIONS

This application is a continuation application of and claims priority under 35 U.S.C. § 120 to U.S. patent application Ser. No. 15/265,427, titled "Multi-Piece Frames" and filed on Sep. 14, 2016, which is a continuation of and claims priority to U.S. patent application Ser. No. 14/242,387, titled "Multi-Piece Frames" and filed on Apr. 1, 2014, which claims priority under 35 U.S.C. § 119 to U.S. Provisional Patent Application Ser. No. 61/809,167, titled "Next Generation Luminaire" and filed on Apr. 5, 2013. The entire contents of these aforementioned applications are hereby incorporated herein by reference.

TECHNICAL FIELD

Embodiments described herein relate generally to frames, and more particularly to systems, methods, and devices for multi-piece frames for luminaires.

BACKGROUND

Recessed light fixtures are used in many residential, commercial, and industrial applications. Generally, the space in which to install a recessed light fixture is limited, and so the time to install a recessed light fixture can be increased when parts of the light fixture (e.g., the luminaire, the luminaire housing) are cumbersome to install.

SUMMARY

In general, in one aspect, the disclosure relates to frame piece of a frame for a luminaire. The frame piece can include a base and an inner wall along a portion of the base. The frame piece can also include a first frame coupling feature disposed at a first end of the base. The frame piece can further include a second frame coupling feature disposed at a second end of the base. The first frame coupling feature can be configured to mechanically couple to the second frame coupling feature of a first adjacent frame piece. The second frame coupling feature can be configured to mechanically couple to the first frame coupling feature of a second adjacent frame piece. The inner wall can have a first shape and a first size that is substantially similar to a second shape and a second size of a portion of a housing of the luminaire.

In another aspect, the disclosure can generally relate to a luminaire. The luminaire can include a frame having a number of frame pieces, where each of the frame pieces has an inner wall, a first frame coupling feature, and a second frame coupling feature, where the first frame coupling feature of a frame piece mechanically couples to the second frame coupling feature of a first adjacent frame piece, and where the second frame coupling feature of the frame piece mechanically couples to the first frame coupling feature of a second adjacent frame piece. The frame can have a cavity disposed therethrough, where the cavity is formed by the inner wall of the frame pieces, where the cavity receives a housing of the luminaire.

In yet another aspect, the disclosure can generally relate to a frame for a luminaire. The frame can include a number of frame pieces, where each of the frame pieces has an inner wall, a first frame coupling feature, and a second frame coupling feature, where the first frame coupling feature of a frame piece mechanically couples to the second frame coupling feature of a first adjacent frame piece, and where the second frame coupling feature of the frame piece mechanically couples to the first frame coupling feature of a second adjacent frame piece. The frame can have a cavity disposed therethrough, where the cavity is formed by the inner wall of the frame pieces, where the cavity is configured to receive a housing of the luminaire.

These and other aspects, objects, features, and embodiments will be apparent from the following description and the appended claims.

BRIEF DESCRIPTION OF THE DRAWINGS

The drawings illustrate only example embodiments of multi-piece frames and are therefore not to be considered limiting of its scope, as multi-piece frames may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

DETAILED DESCRIPTION OF EXAMPLE EMBODIMENTS

The example embodiments discussed herein are directed to systems, apparatuses, and methods of multi-piece frames. While the Figures shown and described herein are directed to multi-piece frames in luminaires, example multi-piece frames can also be used in other applications aside from luminaires, including but not limited to motor control centers, relay cabinets, and enclosures. Thus, the examples of multi-piece frames described herein are not limited to luminaires.

With respect to luminaires, while the example embodiments described herein are directed to recessed luminaires, example embodiments (or portions thereof) can also be used for non-recessed luminaires. Example luminaires can be used with one or more of a number of different types of lighting systems, including but not limited to light-emitting diode (LED) lighting systems, fluorescent lighting systems, organic LED lighting systems, incandescent lighting systems, and halogen lighting systems. Therefore, example embodiments described herein should not be considered limited to any particular type of lighting system.

Any example frame piece, or portions (e.g., features) thereof, described herein can be made from a single piece (as from a mold). When an example frame piece portion thereof is made from a single piece, the single piece can be cut out, bent, stamped, and/or otherwise shaped to create certain features, elements, or other portions of a component. For example, as discussed below, at least a portion of a frame piece can be made from a single sheet where various portions are cut out, bent, shaped, and otherwise manipulated to form an example multi-piece frame.

Alternatively, an example frame piece (or portions thereof) can be made from multiple pieces that are mechanically coupled to each other. In such a case, the multiple pieces can be mechanically coupled to each other using one or more of a number of coupling methods, including but not limited to epoxy, welding, fastening devices, compression fittings, mating threads, and slotted fittings. One or more pieces that are mechanically coupled to each other can be coupled to each other in one or more of a number of ways, including but not limited to fixedly, hingedly, removeably, slidably, and threadably.

Components and/or features described herein can include elements that are described as coupling, fastening, securing, or other similar terms. Such terms are merely meant to distinguish various elements and/or features within a component or device and are not meant to limit the capability or function of that particular element and/or feature. For example, a feature described as a "coupling feature" can couple, secure, fasten, and/or perform other functions aside from merely coupling. In addition, each components and/or feature described herein can be made of one or more of a number of suitable materials, including but not limited to metal, rubber, and plastic.

A coupling feature (including a complementary coupling feature) as described herein can allow one or more components and/or portions of an example multi-piece frame to become mechanically coupled, directly or indirectly, to a portion (e.g., a junction box, a hangar bar, a housing) of a luminaire and/or to another portion of the multi-piece frame. A coupling feature can include, but is not limited to, a portion of a hinge, an aperture (as shown), a slot, a spring clip, a tab, a detent, and a mating thread. An example multi-piece frame can be coupled to a junction box, a housing, and/or another component of a luminaire by the direct use of one or more coupling feature. In addition, or in the alternative, an example multi-piece frame can be coupled to a junction box, a housing, and/or another component of a luminaire using one or more independent devices that interact with one or more coupling features disposed on the example multi-piece frame and/or other component of a luminaire. Examples of such devices can include, but are not limited to, a pin, a hinge, a fastening device (e.g., a bolt, a screw, a rivet), and a spring. One coupling feature described herein can be the same as, or different than, one or more other coupling features described herein.

As described herein, a user can be any person that interacts with an example multi-piece frame or a portion thereof. Examples of a user may include, but are not limited to, an engineer, an electrician, a maintenance technician, a mechanic, an operator, a consultant, a contractor, a homeowner, and a manufacturer's representative.

The components of example multi-piece frames described herein can be physically placed in outdoor environments. In addition, or in the alternative, example multi-piece frames can be subject to extreme heat, extreme cold, moisture, humidity, high winds, dust, and other conditions that can cause wear on the multi-piece frames or components thereof.

In certain example embodiments, the components of multi-piece frames, as well as any coupling (e.g., mechanical, electrical) between such components, are made of materials that are designed to maintain a long-term useful life and to perform when required without mechanical failure.

Any component described in one or more figures herein can apply to any subsequent figures having the same label. In other words, the description for any component of a subsequent figure can be considered substantially the same as the corresponding component described with respect to a previous figure. The numbering scheme for the components in the figures herein parallel the numbering scheme for the components of previously described figures in that each component is a three digit number having either the identical last two digits or all digits being identical.

Example embodiments of multi-piece frames will be described more fully hereinafter with reference to the accompanying drawings, in which example embodiments of multi-piece frames are shown. Multi-piece frames may, however, be embodied in many different forms and should not be construed as limited to the example embodiments set forth herein. Rather, these example embodiments are provided so that this disclosure will be thorough and complete, and will fully convey the scope of multi-piece frames to those of ordinary skill in the art. Like, but not necessarily the same, elements (also sometimes called components) in the various figures are denoted by like reference numerals for consistency. Terms such as "first," "second," "top," "base," "open," and "closed" are used merely to distinguish one component (or part of a component or state of a component) from another. Such terms are not meant to denote a preference or a particular orientation.

Figure 1:
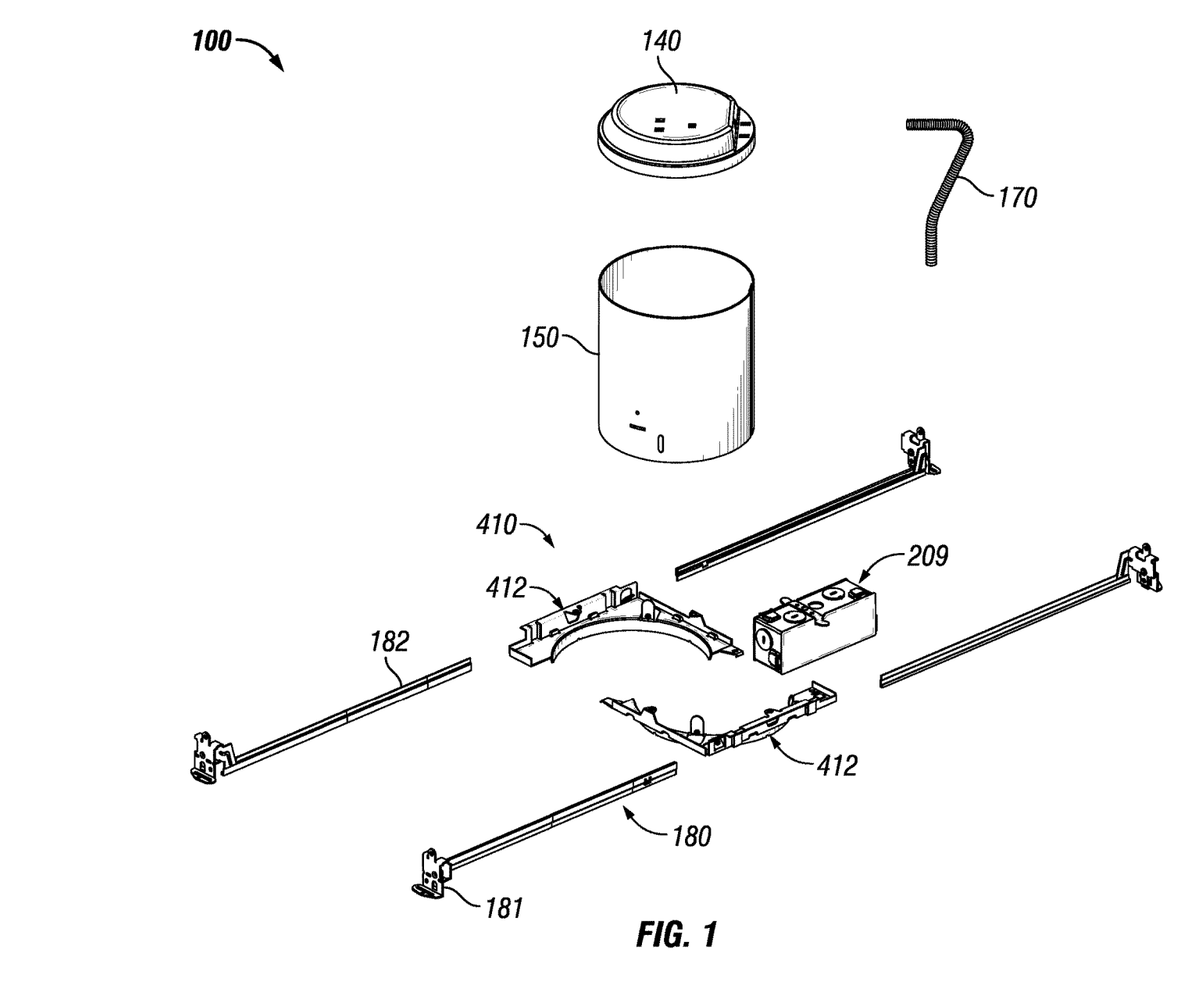
FIG. 1 shows an exploded view of a luminaire that includes a multi-piece frame in accordance with certain example embodiments.

FIG. 1 shows an exploded view of an example luminaire 100 in accordance with certain example embodiments. In one or more embodiments, one or more of the components shown in FIG. 1 may be omitted, added, repeated, and/or substituted. Accordingly, embodiments of luminaires with multi-piece frames should not be considered limited to the specific arrangements of components shown in FIG. 1. For example, the luminaire 100 can have a single-piece frame rather than a multi-piece frame.

Referring to FIG. 1, the luminaire 100 can include, for example, an optional housing top 140 (sometimes called a can top 140), an optional housing 150 (sometimes called a can 150), flexible conduit 170, a multi-piece frame 410, a junction box 209, and an optional mounting feature 180. The optional mounting feature 180 can have any features and configurations to mount the rest of the luminaire 100 to one or more structures (e.g., a wall, a ceiling, a piece of wood, a post). In this example, the mounting feature 180 includes one or more hanger bars 182 and one or more hanger bar fasteners 181. An optional hanger bar fastener 181 can be mechanically coupled to each end of a hanger bar 182 and can be mechanically coupled to a surface (e.g., a wall, a piece of wood, a metal frame, a concrete pillar) that is used to support the luminaire 100.

The housing 150 can have any shape and/or size appropriate for mechanically coupling to the frame 410. The housing 150 can be used to enclose one or more of a number of components of the luminaire 100. Such components can include, but are not limited to, a power source (e.g., a driver, a ballast), one or more light sources, a fan, and a lens. The housing 150 can have a housing top 140, disposed at the top and/or at some other location on the housing 150, to provide access within the housing 150.

In certain example embodiments, the flexible conduit 170 is coupled to both the junction box 209 and a portion of the housing 150. For example, in this case, the flexible conduit 170 is mechanically coupled to the housing top 140 of the housing 150. The flexible conduit 170 can be any component that is capable of containing (hosting) one or more electrical wires. In such a case, the flexible conduit 170 can protect the one or more electrical wires disposed therein from elements (e.g., dirt, moisture) and/or physical harm (e.g., pinching).

Such electrical wires can be used to provide power and/or control between the junction box 209 and the housing 150. Thus, at least part of the electrical wire is disposed in the junction box 209, part is disposed in the flexible conduit 170, and part is disposed in the housing 150. As the name implies, the flexible conduit 170 is bendable and movable so that, as the junction box 209 is repositioned to different positions on the multi-piece frame 410, the flexible conduit 170 can allow for this repositioning while remaining fixedly coupled to both the junction box 209 and the housing 150. The junction box 209 can include one or more of a number of components, some of which are described below with respect to FIGS. 4A-4C.

In certain example embodiments, the multi-piece frame 410 is an assembly of two or more frame pieces 412 that are shaped and sized substantially the same relative to each other. One or more of the frame pieces 412 can be mechanically coupled to one or more hanger bars 182 on one side of each of the multi-piece frame 410 so that the hanger bars 182 extend to the left and right of the multi-piece frame 410 at both the top and bottom ends of the multi-piece frame 410. In addition, or in the alternative, the multi-piece frame 410 can be directly coupled to a mounting surface to support the luminaire 100. The frame 410 can have any shape and/or size suitable for the housing 150. In certain example embodiments, one or more portions (e.g., sides) of the multi-piece frame 410 can include one or more complementary coupling features (described below) that receive and/or otherwise couple to one or more coupling features of the junction box 209. Details about each of these and other components of the multi-piece frame 410 are described below with respect to FIGS. 2A-2C.

Figure 2A:
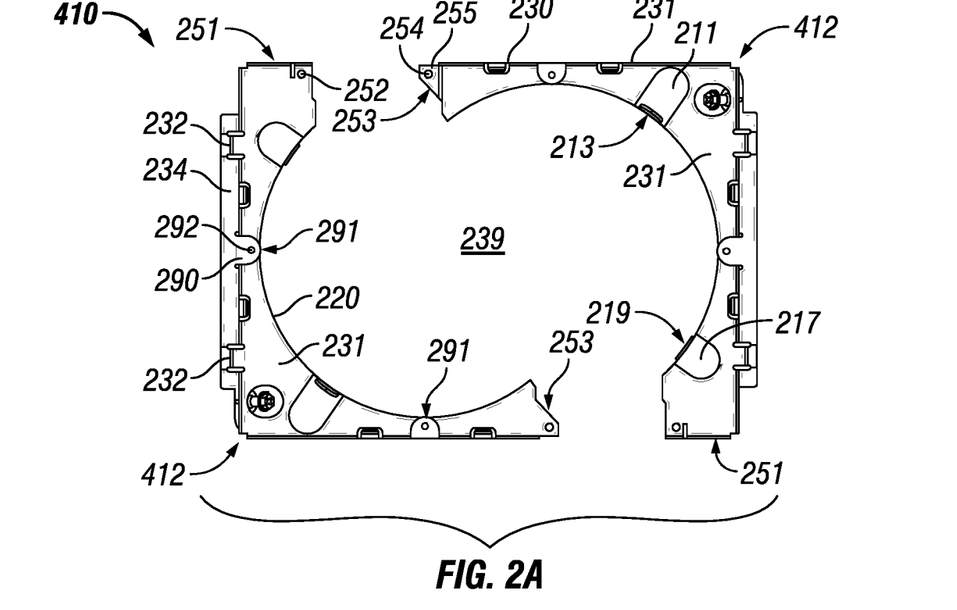
FIGS. 2A-2C show various views of a portion of a multi-piece frame in accordance with certain example embodiments.
Figure 2B:
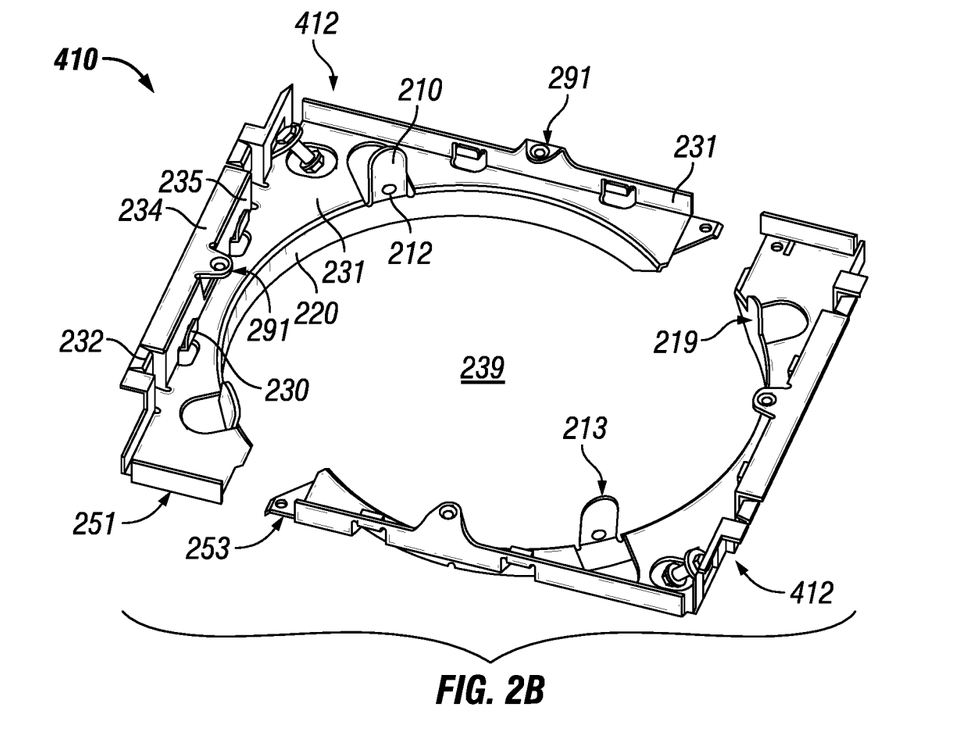
Figure 2C:
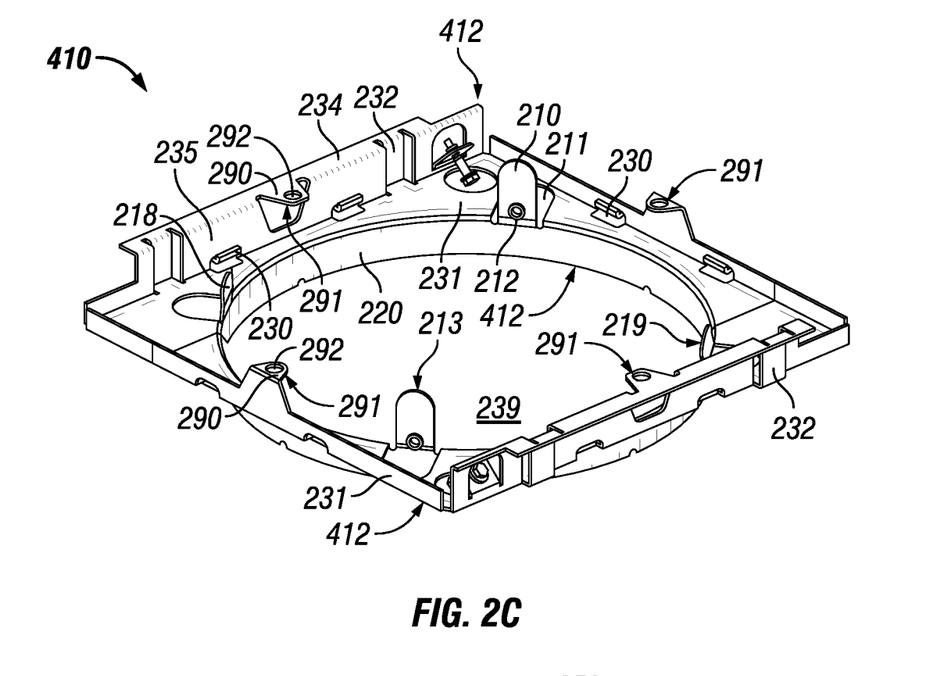

FIGS. 2A-2C show various views of an example frame 410 of a luminaire in accordance with certain example embodiments. Specifically, the example frame 410 is made of multiple (in this case, two) frame pieces 412. FIG. 2A shows a top exploded view of the two frame pieces 412. FIG. 2B shows a perspective view of the two frame pieces 412 mechanically coupled to each other to form the frame 410. FIG. 2C shows an exploded perspective view of the two frame pieces 412. In one or more embodiments, one or more of the components shown in FIGS. 2A-2C may be omitted, added, repeated, and/or substituted. Accordingly, embodiments of a frame made from multiple frame pieces should not be considered limited to the specific arrangements of components shown in FIGS. 2A-2C.

Referring to FIGS. 1-2C, in certain example embodiments, each of the multiple frame pieces 412 of a frame 410 is substantially identical to each other. For example, as shown in FIGS. 2A-2C, the two frame pieces 412 are substantially identical to each other in shape, configuration, and size. When the multiple frame pieces 412 are coupled to each other to form a frame 410, the can 150 can be positioned within a cavity 239 formed by the inner wall 220 of each frame piece 412 of the frame 410. The shape (e.g., circular, rectangular) and size of the cavity 239 formed by the inner wall 220 can be substantially the same as, or slightly larger than, the shape and size of the portion of the housing 150 (or one or more light source components (e.g., a light source, a bulb, a trim, light emitted by a light source, a light source component frame) of the light fixture) that is disposed within the cavity 239. In some cases, rather than forming a physical wall, the inner wall 220 (also called an inner surface 220 herein) can merely be an edge (e.g., a lip) of the base 231. Further, the housing 150 can be mechanically coupled to one or more portions of the frame 410. Specifically, each frame piece 412 can include one or more of a number of coupling features. If there is no housing 150, then such coupling features can couple, directly or indirectly, to a light source component.

For example, as shown in FIGS. 2A-2C, a frame piece 412 can include one or more coupling features 213 (also called housing coupling features 213) and/or one or more coupling features 219 (also called housing coupling features 219). If there is no housing, then the coupling features 213 and/or the coupling features 219 can be called light source component coupling features. Each coupling feature of a frame piece 412 can be used, directly or indirectly, to mechanically couple the housing 150 (or a light source component) to the frame piece 412. The coupling feature 213 can include a body 210 that has an aperture 212 that traverses therethrough. In certain example embodiments, the body 210 of the coupling feature 213 is part of the base 231 of the frame piece 412. For example, as shown in FIGS. 2A-2C, one or more sides of the body 210 of the coupling feature 213 can be cut out from the base 231 and bent away from the base 231, creating an aperture 211 in the base 231.

Another example of a coupling feature of a frame piece 412 is coupling feature 219. The coupling feature 219 can include a body 218. In certain example embodiments, the body 218 of the coupling feature 219 is part of the base 231 of the frame piece 412. For example, as shown in FIGS. 2A-2C, one or more sides of the body 218 of the coupling feature 219 can be cut out from the base 231 and bent away from the base 231, creating an aperture 217 in the base 231. There may be no aperture that traverses through the body 218 of the coupling feature 219. The example coupling feature 219 of a frame piece 412 can be used to help position and/or retain the housing 150 when the housing 150 is coupled to a frame piece 412 of a frame 410. The coupling feature 219 can be adjusted (e.g., bent) to abut against a portion of a side of the housing 150.

A frame piece 412 can also include one or more other coupling features 291 (also called junction box coupling features 291) for mechanically coupling a junction box 209 to the frame piece 412. Such coupling features 291 can be, as shown by example in FIGS. 2A-2C, one or more mating shelves 290 and/or one or more receiving tabs 230. In certain example embodiments, the receiving tabs 230 are also considered to be junction box coupling features 230. One or more sides and/or portions of a frame piece 412 can include one or more mating shelves 290 and one or more receiving tabs 230. In such a case, the mating shelf 290 can have a shape, size, and orientation that allows the mating shelf 290 to couple to a corresponding coupling feature of a junction box 209. The mating shelf 290 can include one or more of a number of fastening features 291. For example, as shown in FIGS. 2A-2C, the mating shelf 290 can include a fastening feature 291 in the form of an aperture through which a fastening device (e.g., a bolt, a nut, a clip) can be disposed. Thus, the fastening device can traverse at least part of fastening feature 291 and mating shelf 290.

The receiving tabs 230 can be bent inward to form vertical and/or horizontal boundaries for coupling features of a junction box 209. In certain example embodiments, the receiving tabs 230 form some angle (e.g., approximately 90°, approximately 180° relative to the base 231. The receiving tabs 230 can receive (e.g., can be slidably coupled to) one or more coupling features of a junction box 209 to couple the junction box 209 to the frame piece 412. The receiving tabs 230 can prevent the corresponding coupling features of the junction box 209 from moving further downward toward and/or rotating from a vertical position with respect to the frame piece 412.

In certain example embodiments, a frame piece 412 can include one or more coupling features that allow the frame piece 412 to receive and couple to one or more hanger bars 182. Such coupling features can include, as shown by way of example in FIGS. 2A-2C, one or more recesses 232, a top surface 234, and a side surface 235. In such a case, the recesses 232, the top surface 234, and the side surface 235 can form a channel through which a hanger bar 182 (or other portion of a luminaire used to support the frame 410) can be disposed. The channel (and/or other features) used to mechanically couple a mounting feature 180 to the frame 410 can be called a mounting coupling feature, which can be disposed on one or more frame pieces 412 of the frame 410.

In certain example embodiments, each frame piece 412 is mechanically coupled to another adjacent frame piece 412 by using one or more of a number of coupling features. For example, as shown in FIGS. 2A-2C, each frame piece 412 can include a frame coupling feature 251 and a complementary frame coupling feature 253. The frame coupling feature 251 and the complementary frame coupling feature 253 can include one or more of a number of coupling features and/or components (e.g., apertures, slots, tabs, mating threads). For example, as shown in FIGS. 2A-2C, the frame coupling feature 251 can be part of an end portion of the base 231 of the frame piece 412 and can include an aperture 252 and/or some other coupling feature. The frame coupling feature 251 can have a smaller thickness compared to the rest of the base 231 of the frame piece 412. The smaller thickness of the frame coupling feature 251 can be biased toward a side (e.g., top side, bottom side) of the base 231, toward multiple sides of the base 231 with a slot in between, can have some other configuration, and/or some combination thereof.

In certain example embodiments, the frame coupling feature 253, disposed on a different portion (e.g., at the opposite end) of the frame piece 412, complements the frame coupling feature 251 so that, when the frame coupling feature 253 of one frame piece 412 is mechanically coupled to the frame coupling feature 251 of another frame piece 412, the thickness of the frame coupling feature 251 and the thickness of the frame coupling feature 253 are substantially the same as the thickness of the base 231. In addition, the plane formed by the frame coupling feature 251 and the frame coupling feature 253, when coupled to each other, is on substantially the same plane as the base 231.

Thus, as an example, the frame coupling feature 253 can include a portion 255 that protrudes laterally away from the base 231 and has a reduced thickness compared to the thickness of the base 231. The portion 255 can include an aperture 254 that traverses therethrough. The position of the portion 255 along the height (thickness) of the base 231 can correspond to a position of an opening (e.g., a slot) in the frame coupling feature 251. When the frame coupling feature 251 and the frame coupling feature 253 slide together to couple to each other, the aperture 252 of the frame coupling feature 251 can substantially align with the aperture 254 of the frame coupling feature 253. In such a case, a fastening device (e.g., a screw, a nut, a rivet) can be used to traverse some or all of the aperture 252 and the aperture 254 to mechanically couple the frame coupling feature 251 and the frame coupling feature 253 together.

Figure 3:
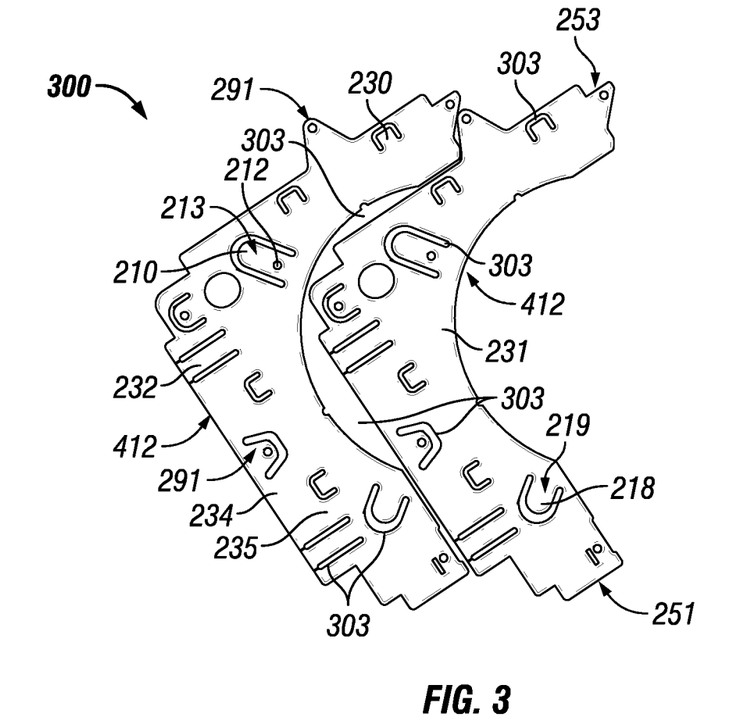
FIG. 3 shows a flat view of two example pieces of a multi-piece frame in accordance with certain example embodiments.

FIG. 3 shows a flat view of an assembly 300 of two example frame pieces 412 in accordance with certain example embodiments. Here, the frame pieces 412 can be created by cutting, pressing, stamping, bending, and/or otherwise manipulating a continuous sheet of some material (e.g., metal, plastic, rubber). Some blanks 303 of the assembly 300 can be stamped out to allow separation of one frame piece 412 from another frame piece 412 and/or to allow a portion (e.g., coupling feature 213, coupling feature 219) to be bent at some angle relative to the base 231.

Figure 4A:
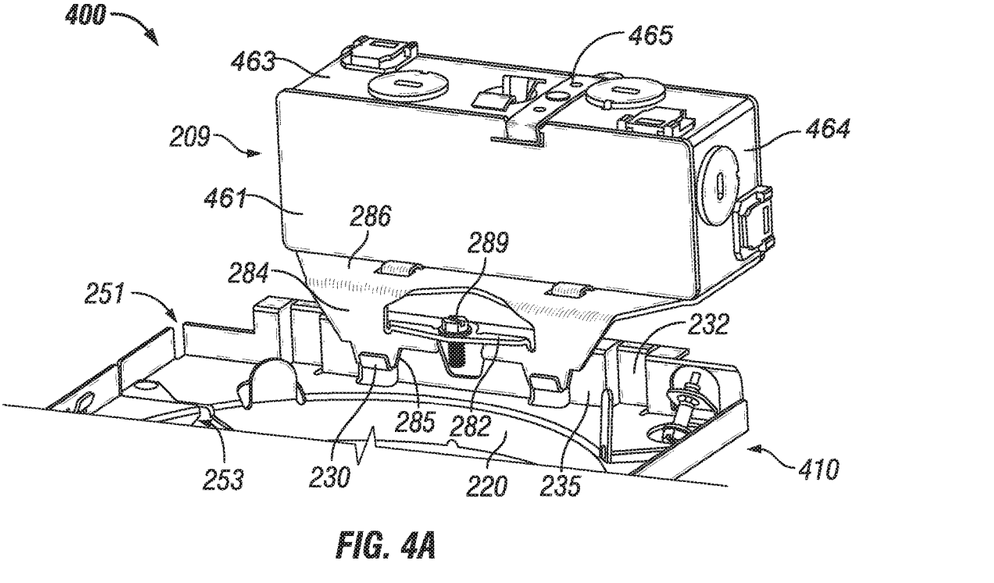
FIGS. 4A-4C show various views of a portion of a luminaire that includes an example multi-piece frame in accordance with certain example embodiments.
Figure 4B:
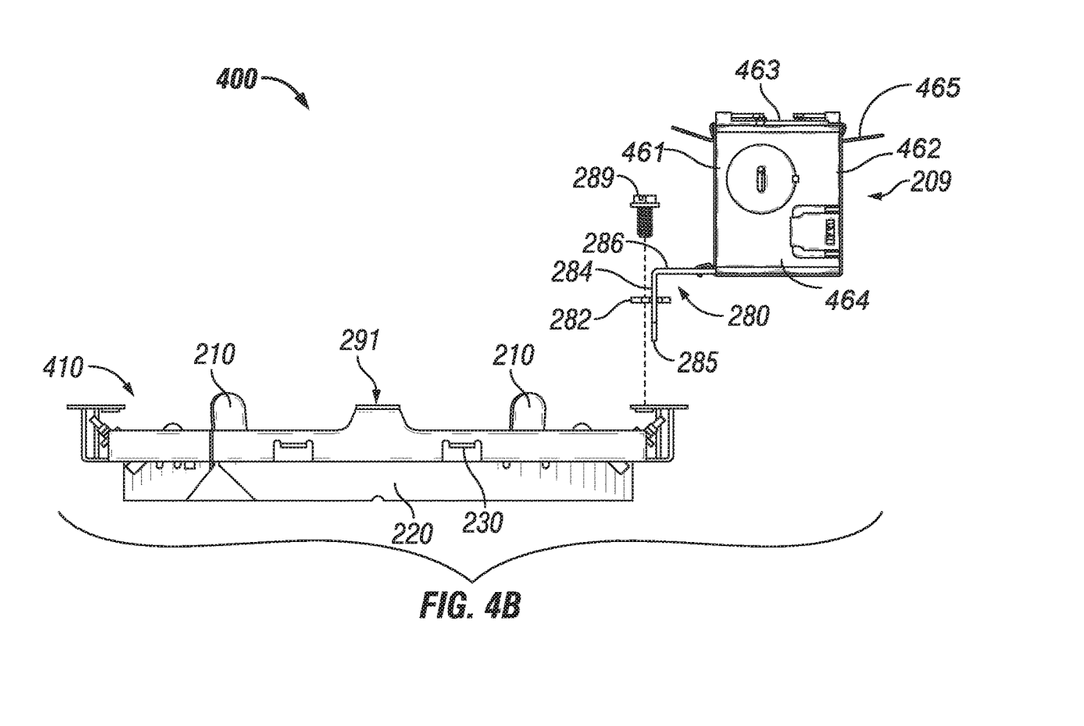
Figure 4C:
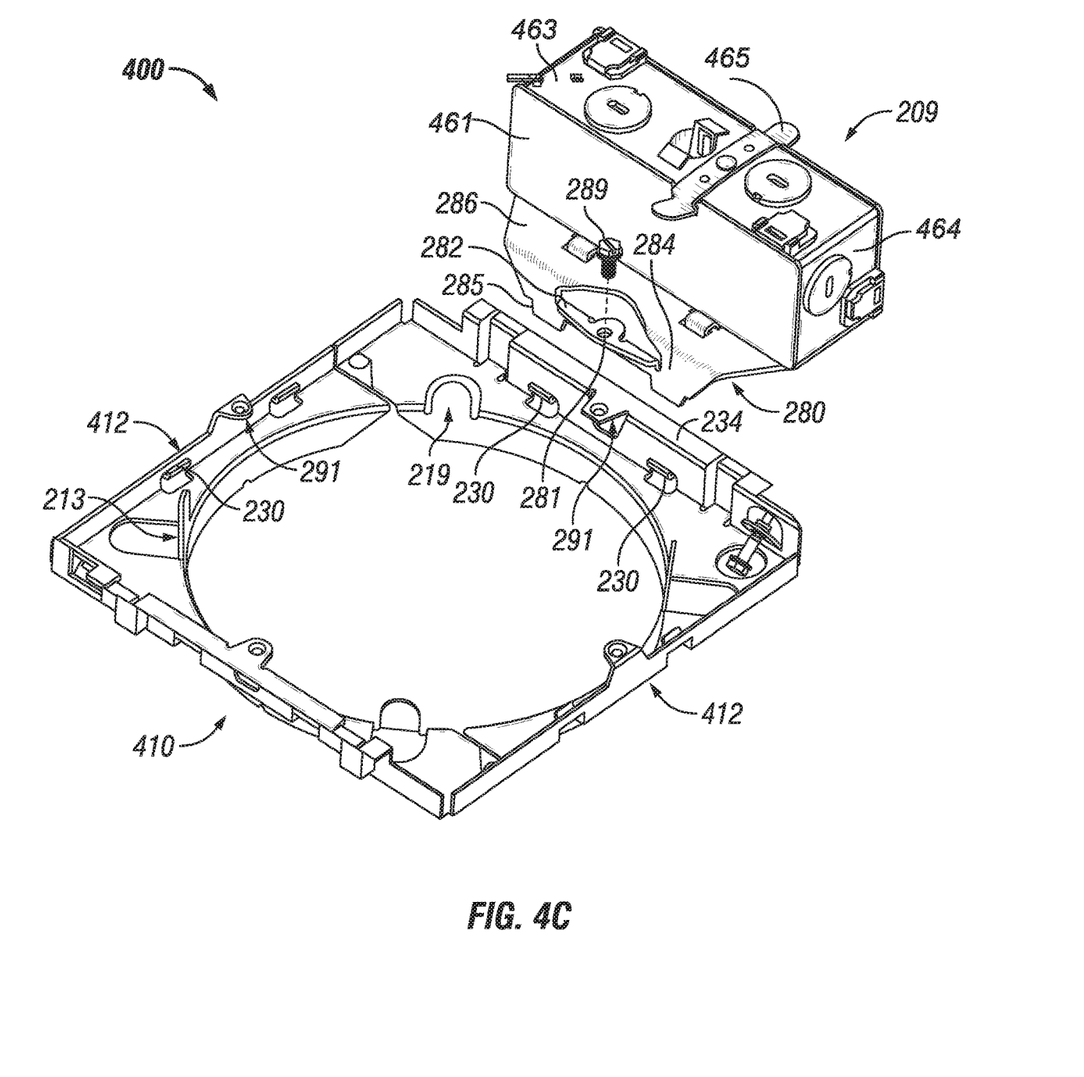

FIGS. 4A-4C show various views of a portion 400 of the luminaire 100 of FIG. 1 that includes a junction box 209 coupled to an example frame 410 in accordance with certain example embodiments. Specifically, FIG. 4A shows a perspective view of the junction box 209 mechanically coupled to an example frame 410. FIGS. 4B and 4C show a semi-exploded side view and a perspective view, respectively, of the junction box 209 and the frame 410. In one or more embodiments, one or more of the components shown in FIGS. 4A-4C may be omitted, added, repeated, and/or substituted. Accordingly, embodiments of a junction box coupled to a frame should not be considered limited to the specific arrangements of components shown in FIGS. 4A-4C.

Referring to FIGS. 1-4C, the junction box 209 can include one or more coupling features 280 disposed on, or extending from, a bottom wall 286 of the junction box 209. Each coupling feature 280 can include a coupling platform 282 that includes a coupling feature 281. For example, the coupling feature 280 can be a type of shelf or extension that extends approximately perpendicularly from the distal extension 284. The positioning of the coupling feature 280 can be such that the coupling feature 280 mechanically couples with one portion of the frame 410 while the coupling elements 285 couple to a different portion of the frame 410. The coupling feature 280 can include one or more of a number of fastening features 281. For example, as shown in FIGS. 4A and 4C, the coupling feature 280 can include a fastening feature 281 in the form of an aperture through which a fastening device 289 (e.g., a bolt, a nut, a clip) can be disposed. The junction box 209 can also include one or more walls that form a cavity. For example, as shown in FIGS. 4A-4C, in addition to the bottom wall 286, the junction box 209 can include a front wall 461, a rear wall 462, a top wall 463, a coupling feature 465 disposed on the top wall 463, and two side walls 464, where the bottom wall 286 and the rear wall 462 are formed from a single piece, and where the coupling feature 465 includes clips that can individually couple to the front wall 461 and the rear wall 462.

Figure 5A:
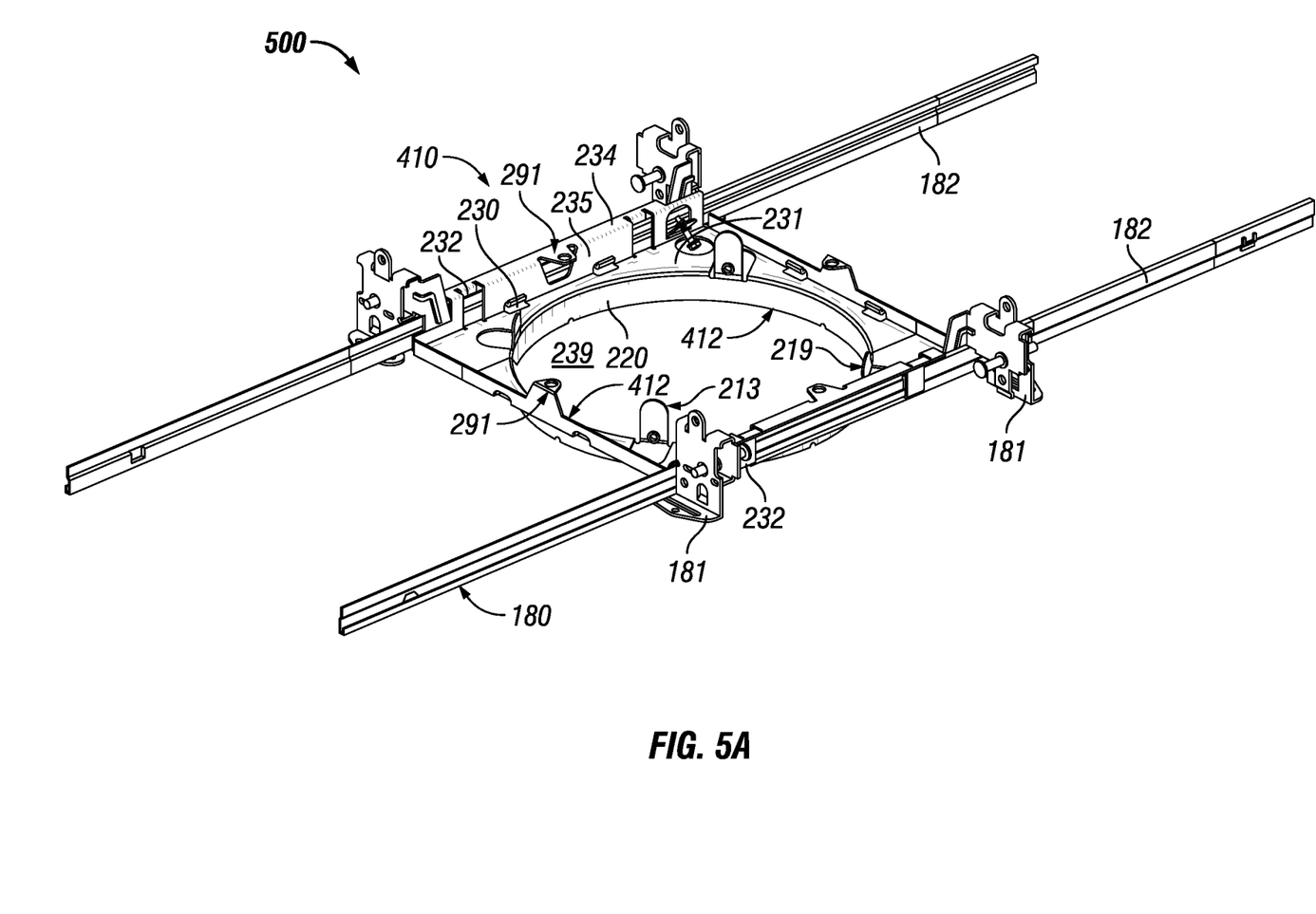
FIGS. 5A and 5B show various views of a different portion of a luminaire that includes an example multi-piece frame in accordance with certain example embodiments.
Figure 5B:
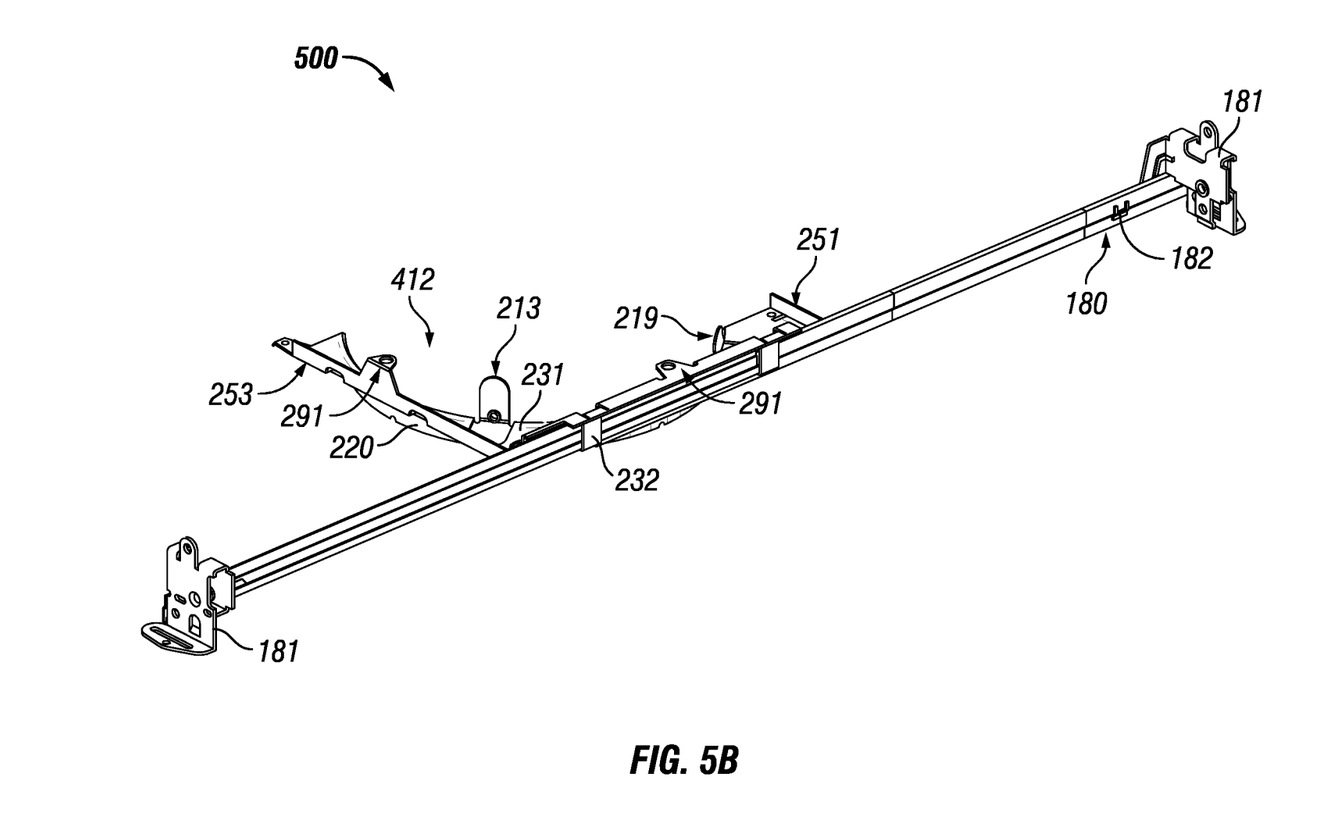

FIGS. 5A and 5B show various views of a different portion 500 of the luminaire 100 of FIG. 1 that includes an example multi-piece frame 410 in accordance with certain example embodiments. Specifically, FIG. 5A shows a perspective view of the mounting feature 180 mechanically coupled to the frame 410, and FIG. 5B shows a perspective view of one of the frame pieces 412 of the frame 410 mechanically coupled to one of the hanger bars 182 of the mounting feature 180. As described above, when the mounting feature 180 includes one or more hanger bars 182, the hanger bar 182 can be disposed within a channel formed by the top surface 234, the side surface 235, and the recesses 232 of one or more frame pieces 412. In such a case, the position of each hanger bar fastener 181 can be adjusted along the length of a hanger bar 182.

In certain example embodiments, one or more portions (e.g., sides) of a frame piece 412 of the frame 410 can include one or more features that receive and/or otherwise couple to the coupling features 280 and the coupling elements 285 of the junction box 209. In other words, certain coupling features (e.g., coupling feature 291) can be disposed on multiple locations of a frame piece 412. For example, as shown in FIGS. 6A-6D, since each of the sides of the frame 410 is similarly arranged with respect to the coupling features 291 and the receiving tabs 230, the junction box 209 can be moved by a user, changing orientations. Specifically, in FIGS. 6A and 6B, the luminaire 600 shows that the junction box 209 is mechanically coupled to a near side of the frame 410, in front of the can 150, parallel and adjacent to the near-most hanger bar 182. A flexible conduit 170 is coupled to both the junction box 209 and the can top 140, which is disposed on the top end of the can 150.

Figure 6A:
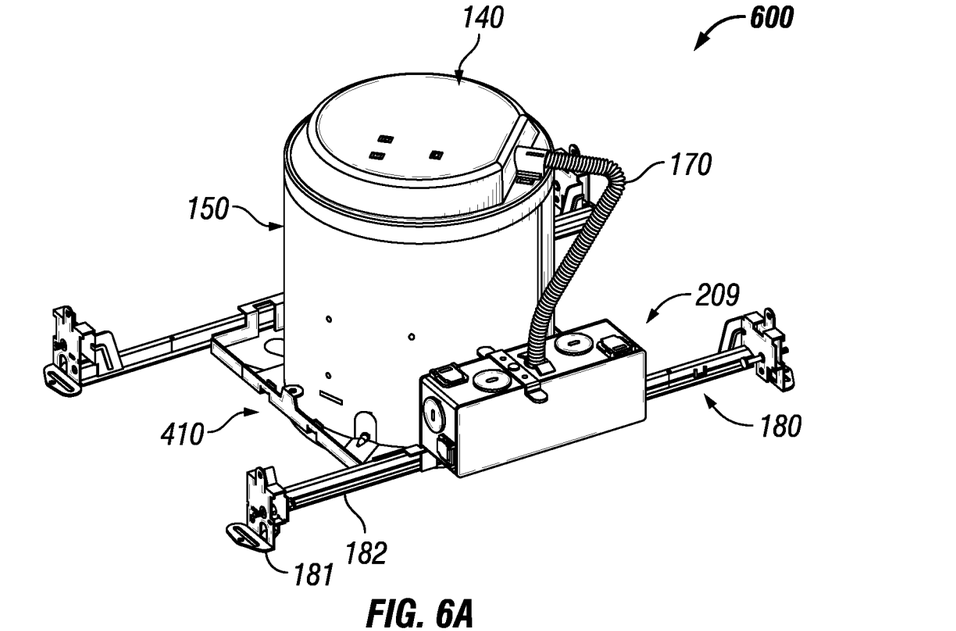
FIGS. 6A-6D show various views of a luminaire having a multi-piece frame in accordance with certain example embodiments.
Figure 6B:
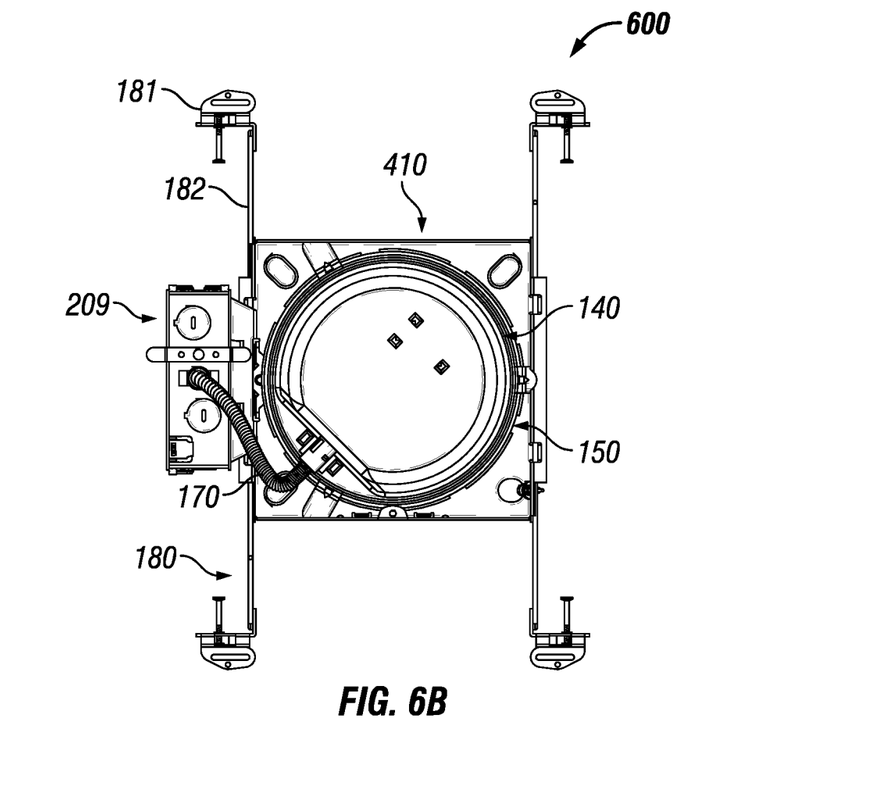
Figure 6C:
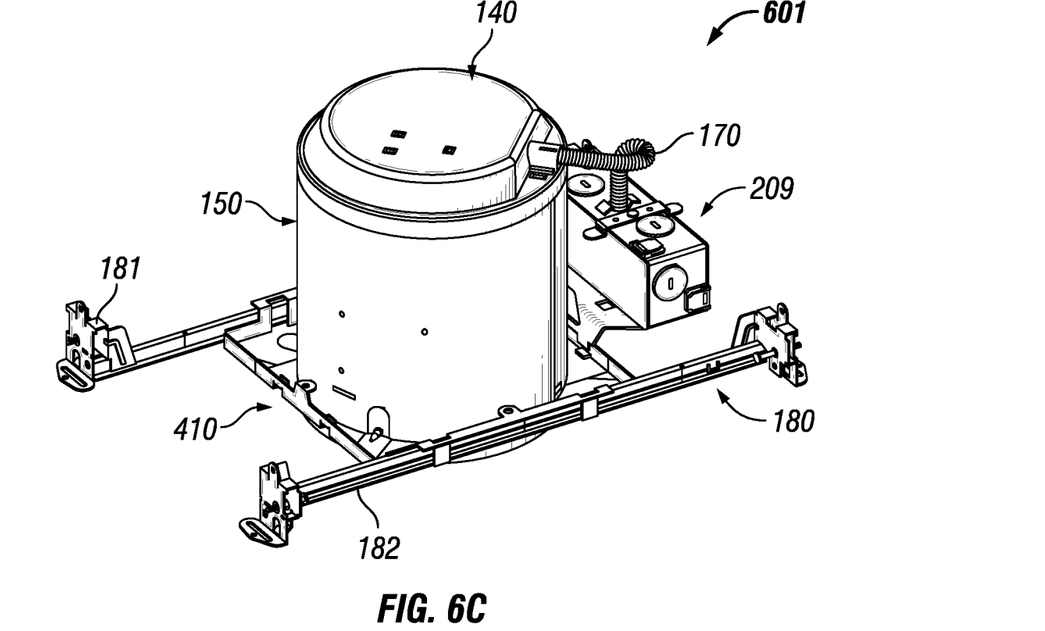
Figure 6D:
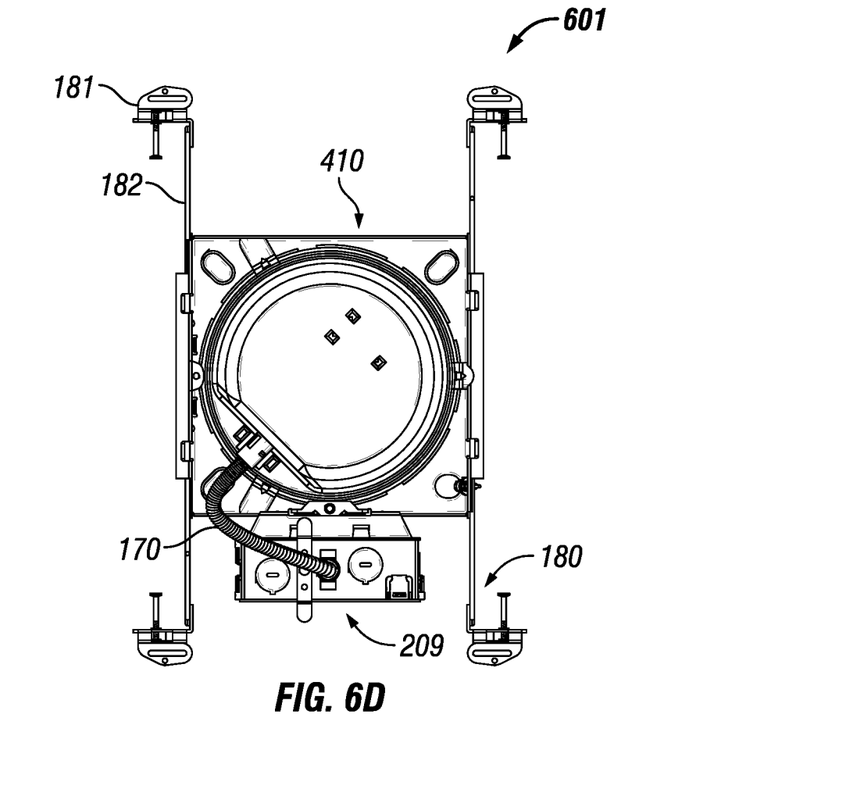

FIGS. 6C and 6D show the luminaire 601 where the relative position of the junction box 209 is rotated counterclockwise by 90° compared to the position of the junction box 209 in FIGS. 6A and 6B. Specifically, the junction box 209 can be decoupled from the relative position shown in FIGS. 6A and 6B by removing the fastening device 289 and sliding the coupling elements 285 away from the receiving tabs 230. Once done, the junction box 209 can be coupled to an adjacent edge of the frame 410 (on the same or a different frame piece 412) in the manner described above. In addition, or in the alternative, the relative position of the junction box 209 can be rotated by some angle other than 90° or a multiple of 90°. For example, the relative position of the junction box 209 can be rotated by 180°. As another example, the relative position of the junction box 209 can be rotated by 45°.

Certain example embodiments provide a number of benefits. Examples of such benefits include, but are not limited to, use of fewer materials, simplified installation, simplified inspection, simplified maintenance, installation of a luminaire in relatively small spaces, and reduced cost. Example multi-piece frames described herein also allow for increased flexibility for manufacturing, installing, and/or maintaining a luminaire.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A frame for a luminaire, the frame comprising:
    a body having an aperture disposed therethrough, wherein the aperture is configured to receive a housing of the luminaire;
    at least one housing coupling feature disposed at a first location of the body, wherein the at least one housing coupling feature is configured to couple to the housing of the luminaire;
    at least one first junction box coupling feature disposed at a second location of the body, wherein the at least one first junction box coupling feature is configured to detachably couple to a junction box of the luminaire, wherein the junction box, when coupled to the at least one first junction box coupling feature, is disposed in a first position relative to the housing of the luminaire; and
    at least one second junction box coupling feature disposed at a third location of the body, wherein the at least one second junction box coupling feature is configured to detachably couple to the junction box of the luminaire, wherein the junction box, when coupled to the at least one second junction box coupling feature, is disposed in a second position relative to the housing of the luminaire,
    wherein the junction box has a length and a width that is less than the length,
    wherein the length of the junction box, when the junction box is in the first position, is oriented in parallel to a first tangent to the aperture at a first point in greatest proximity to the junction box, and
    wherein the length of the junction box, when the junction box is in the second position, is oriented in parallel to a second tangent to the aperture at a second point in greatest proximity to the junction box.

2. The frame of claim 1, wherein the first position of the junction box orients the junction box at a 90° offset relative to the second position of the junction box.

3. The frame of claim 1, wherein the at least one first junction box coupling feature comprises at least one first receiving tab.

4. The frame of claim 3, wherein the at least one first junction box coupling feature further comprises a mating shelf.

5. The frame of claim 4, wherein the mating shelf comprises an aperture that traverses therethrough.

6. The frame of claim 1, wherein the body comprises a first piece and a second piece that are coupled to each other.

7. The frame of claim 6, wherein the at least one first junction box coupling feature is disposed on the first piece, and wherein the at least one second junction box coupling feature is disposed on the second piece.

8. A luminaire comprising:
    a frame comprising:
        a frame body having an aperture disposed therethrough, wherein the aperture is configured to receive a housing of the luminaire;
        at least one first junction box coupling feature disposed at a first location on the frame body; and
        at least one second junction box coupling feature disposed at a second location on the frame body; and
    a junction box comprising:
        a junction box body comprising at least one wall that forms a cavity, wherein the at least one wall forms a length and a width of the junction box body, wherein the length is greater than the width; and
        at least one first frame coupling feature disposed on the junction box body,
    wherein the at least one first frame coupling feature of the junction box is configured to be removably coupled to the at least one first junction box coupling feature and the at least one second junction box coupling feature of the frame,
    wherein the junction box has a first orientation with respect to the frame when the at least one first frame coupling feature is coupled to the at least one first junction box coupling feature,
    wherein the junction box has a second orientation with respect to the frame when the at least one first frame coupling feature is coupled to the at least one second junction box coupling feature, wherein the length of the junction box, when the junction box is in the first orientation, is oriented in parallel to a first tangent to the aperture at a first point in greatest proximity to the junction box, and wherein the length of the junction box, when the junction box is in the second orientation, is oriented in parallel to a second tangent to the aperture at a second point in greatest proximity to the junction box.

9. The luminaire of claim 8, wherein the junction box is movable between the first location and the second location without changing any electrical connections.

10. The luminaire of claim 8, wherein the junction box is movable between the first location and the second location without using a tool.

11. The luminaire of claim 8, wherein the at least one wall of the junction box comprises a first wall and a second wall, wherein the first wall is movable relative to the second wall to provide access to the cavity when the at least one first frame coupling feature is coupled to the frame.

12. The luminaire of claim 11, wherein the at least one wall of the junction box further comprises a third wall that opposes a portion of the first wall when the at least one wall encloses the cavity, wherein the third wall is held in place, in part, by the first wall.

13. The luminaire of claim 12, wherein the at least one wall of the junction box further comprises a fastening feature, wherein the fastening feature helps to secure the first wall and the third wall when the at least one wall encloses the cavity.

14. The luminaire of claim 13, wherein the fastening feature secures the first wall independently of securing the third wall.

15. The luminaire of claim 13, wherein the fastening feature releases the first wall and the third wall without using a tool.

16. The luminaire of claim 13, wherein the fastening feature comprises a spring clip.

17. The luminaire of claim 8, wherein the frame comprises a first piece and a second piece that are coupled to each other.

18. The luminaire of claim 17, wherein the first piece comprises the at least one first junction box coupling feature, and wherein the second piece comprises the at least one second junction box coupling feature.

19. A junction box for a luminaire, the junction box comprising:

a body comprising a plurality of walls that form a cavity, wherein the plurality of walls comprises a front wall and at least one side wall, wherein the front wall is longer than the at least one side wall; and at least one first frame coupling feature disposed on the body, wherein the at least one first frame coupling feature of the junction box is configured to be removably coupled to a plurality of first junction box coupling features disposed at a plurality of locations on a frame of the luminaire, wherein the front wall of the body is configured to be oriented in parallel to a tangent to a point in greatest proximity to an inner surface of the frame when the at least one first frame coupling feature is coupled to any of the plurality of first junction box coupling features, wherein the inner surface of the frame is configured to abut against a housing of the luminaire.

20. The junction box of claim 19, further comprising:

at least one second frame coupling feature disposed on the body, wherein the at least one second frame coupling feature of the junction box is configured to be removably coupled to a plurality of second junction box coupling features, wherein the at least one second frame coupling feature couples to one of the plurality of second junction box coupling features when the at least one first frame coupling feature is coupled to one of the plurality of first junction box coupling features.

* * * * *